(12) United States Patent
Eldredge et al.

(10) Patent No.: US 10,871,037 B2
(45) Date of Patent: Dec. 22, 2020

(54) MECHANICAL LOCKING OF OVOID CUTTING ELEMENT WITH CARBIDE MATRIX

(71) Applicant: SMITH INTERNATIONAL, INC., Houston, TX (US)

(72) Inventors: Ryan Worth Eldredge, South Jordan, UT (US); Gregory Caron, Lehi, UT (US); Jeffrey Bruce Lund, Salt Lake City, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 0 days.

(21) Appl. No.: 16/061,694

(22) PCT Filed: Dec. 14, 2016

(86) PCT No.: PCT/US2016/066704
§ 371 (c)(1),
(2) Date: Jun. 13, 2018

(87) PCT Pub. No.: WO2017/106374
PCT Pub. Date: Jun. 22, 2017

(65) Prior Publication Data
US 2018/0363382 A1      Dec. 20, 2018

Related U.S. Application Data

(60) Provisional application No. 62/267,262, filed on Dec. 14, 2015.

(51) Int. Cl.
*E21B 10/55*   (2006.01)
*E21B 10/54*   (2006.01)
(Continued)

(52) U.S. Cl.
CPC .............. *E21B 10/55* (2013.01); *E21B 10/42* (2013.01); *E21B 10/485* (2013.01); *E21B 10/54* (2013.01);
(Continued)

(58) Field of Classification Search
CPC .......... B23P 15/28; E21B 10/54; E21B 10/42; E21B 10/485; E21B 10/55; E21B 10/5676; E21B 10/573; E21B 10/58
See application file for complete search history.

(56) References Cited

U.S. PATENT DOCUMENTS

RE25,684 E  *  11/1964  Coulter, Jr. ............. B23P 15/28
                                                    76/108.1
4,440,246 A       4/1984  Jurgens
(Continued)

FOREIGN PATENT DOCUMENTS

CN         101153363 A      4/2008
CN         204225772        4/2008
(Continued)

OTHER PUBLICATIONS

International Search Report and Written Opinion issued in International Patent application PCT/US2016/066701 dated Apr. 4, 2017. 16 pages.

(Continued)

*Primary Examiner* — James G Sayre

(57) ABSTRACT

A cutting assembly for use in a drill bit has an ovoid insert including an ultrahard material. The ovoid insert is cast in a matrix such that the matrix surrounds at least part of the ovoid insert, limiting movement of the ovoid insert. Material is removed from the top surface and sidewall of the cutting assembly to produce a cutting edge.

13 Claims, 6 Drawing Sheets

(51) Int. Cl.
  *E21B 10/567* (2006.01)
  *E21B 10/573* (2006.01)
  *E21B 10/58* (2006.01)
  *E21B 10/42* (2006.01)
  *E21B 10/48* (2006.01)
  *B23P 15/28* (2006.01)

(52) U.S. Cl.
  CPC ........ *E21B 10/5676* (2013.01); *E21B 10/573* (2013.01); *E21B 10/58* (2013.01); *B23P 15/28* (2013.01)

(56) References Cited

U.S. PATENT DOCUMENTS

| | | | | |
|---|---|---|---|---|
| 4,453,605 | A * | 6/1984 | Short, Jr. | E21B 10/602 |
| | | | | 175/433 |
| 4,624,830 | A | 11/1986 | Barr | |
| 4,646,857 | A | 3/1987 | Thompson | |
| 4,667,756 | A * | 5/1987 | King | B22D 19/02 |
| | | | | 175/417 |
| 4,858,706 | A * | 8/1989 | Lebourgh | E21B 10/04 |
| | | | | 175/431 |
| 5,007,493 | A * | 4/1991 | Coolidge | E21B 10/55 |
| | | | | 175/432 |
| 5,025,873 | A | 6/1991 | Cerkovnik | |
| 5,248,006 | A | 9/1993 | Scott et al. | |
| 5,282,513 | A | 2/1994 | Jones | |
| 5,348,108 | A | 9/1994 | Scott et al. | |
| 5,447,208 | A | 9/1995 | Lund et al. | |
| 5,487,436 | A | 1/1996 | Griffin | |
| 5,819,862 | A * | 10/1998 | Matthias | E21B 10/567 |
| | | | | 175/428 |
| 5,944,129 | A * | 8/1999 | Jensen | E21B 10/5673 |
| | | | | 175/430 |
| 6,248,447 | B1 * | 6/2001 | Griffin | C04B 37/021 |
| | | | | 175/434 |
| 6,269,894 | B1 | 8/2001 | Griffin | |
| 6,290,008 | B1 * | 9/2001 | Portwood | E21B 10/52 |
| | | | | 175/420.1 |
| 7,426,969 | B2 | 9/2008 | Azar | |
| 7,971,663 | B1 | 7/2011 | Vail | |
| 8,083,012 | B2 * | 12/2011 | Voronin | B22F 7/062 |
| | | | | 175/374 |
| 8,157,029 | B2 | 4/2012 | Zhang et al. | |
| 8,177,001 | B2 | 5/2012 | McClain et al. | |
| 8,191,654 | B2 | 6/2012 | McClain et al. | |
| 8,261,858 | B1 | 9/2012 | Atkins et al. | |
| 8,336,648 | B1 | 12/2012 | Weaver et al. | |
| 8,349,040 | B2 | 1/2013 | Bellin | |
| 8,567,534 | B2 | 10/2013 | Zhang et al. | |
| 8,579,053 | B2 | 11/2013 | Bellin et al. | |
| 8,943,663 | B2 | 2/2015 | Overstreet et al. | |
| 9,068,408 | B2 | 6/2015 | Vempati et al. | |
| 9,097,075 | B2 | 8/2015 | Lin | |
| 10,024,112 | B2 | 7/2018 | Nilen et al. | |
| 10,060,192 | B1 | 8/2018 | Miess et al. | |
| 10,071,355 | B2 | 9/2018 | Olofsson et al. | |
| 10,316,592 | B2 | 6/2019 | Chen | |
| 2002/0077054 | A1 * | 6/2002 | Sung | B01J 3/062 |
| | | | | 451/540 |
| 2002/0084112 | A1 | 7/2002 | Hall et al. | |
| 2003/0037640 | A1 | 2/2003 | Griffin et al. | |
| 2005/0133276 | A1 | 6/2005 | Azar | |
| 2005/0230150 | A1 | 10/2005 | Oldham et al. | |
| 2007/0023206 | A1 | 2/2007 | Keshavan et al. | |
| 2007/0089913 | A1 | 4/2007 | Desai et al. | |
| 2007/0199739 | A1 | 8/2007 | Schwefe et al. | |
| 2008/0142276 | A1 | 6/2008 | Griffo et al. | |
| 2008/0230279 | A1 | 9/2008 | Bitler et al. | |
| 2008/0236900 | A1 | 10/2008 | Cooley et al. | |
| 2008/0296070 | A1 | 12/2008 | Shen et al. | |
| 2009/0178855 | A1 | 7/2009 | Zhang et al. | |
| 2009/0183925 | A1 | 7/2009 | Zhang et al. | |
| 2010/0012389 | A1 | 1/2010 | Zhang et al. | |
| 2010/0025113 | A1 | 2/2010 | Warren et al. | |
| 2010/0025114 | A1 * | 2/2010 | Brady | E21B 10/36 |
| | | | | 175/57 |
| 2010/0206941 | A1 | 8/2010 | Egan et al. | |
| 2010/0288563 | A1 | 11/2010 | Smith | |
| 2010/0314176 | A1 | 12/2010 | Zhang et al. | |
| 2010/0320005 | A1 | 12/2010 | Burhan et al. | |
| 2011/0061942 | A1 | 3/2011 | DiGiovanni | |
| 2011/0083909 | A1 | 4/2011 | Shen et al. | |
| 2011/0174549 | A1 | 7/2011 | Dolan et al. | |
| 2012/0024604 | A1 | 2/2012 | Hoffmaster et al. | |
| 2012/0080239 | A1 | 4/2012 | Lyons et al. | |
| 2013/0112485 | A1 * | 5/2013 | Richert | E21B 10/46 |
| | | | | 175/332 |
| 2014/0087640 | A1 | 3/2014 | Morozov et al. | |
| 2014/0238753 | A1 | 8/2014 | Nelms et al. | |
| 2015/0165591 | A1 | 6/2015 | Can et al. | |

FOREIGN PATENT DOCUMENTS

| | | |
|---|---|---|
| EP | 291314 A2 | 11/1988 |
| EP | 0437855 A2 | 7/1991 |
| WO | WO2005061745 A2 | 7/2005 |
| WO | 2007148060 A1 | 12/2007 |
| WO | WO2011089125 A2 | 7/2011 |
| WO | WO2011144670 A1 | 11/2011 |
| WO | WO2012025516 A2 | 3/2012 |
| WO | WO2012170970 A2 | 12/2012 |
| WO | WO2017106373 A1 | 6/2017 |
| WO | WO2017106388 A1 | 6/2017 |

OTHER PUBLICATIONS

International Search Report and Written Opinion issued in International Patent application PCT/US2016/066704 dated Mar. 27, 2017. 15 pages.

International Search Report and Written Opinion issued in International Patent application PCT/US2016/066730 dated Apr. 6, 2017. 10 pages.

Plemons et al., New cutter technology for faster drilling in hard/abrasive formations. SPE 132143-MS. COS/SPE International Oil and Gas Conference and Exhibition in China, Jun. 8-10, 2010, Beijing, China. Society of Petroleum Engineers. 10 pages.

Westraadt et al., Thermally stable polycrystalline diamond sintered with calcium carbonate. Diamond and Related Materials vol. 16, Issue 11, Nov. 2007, pp. 1929-1935.

Boland et al., Microstructural characterisation and wear behaviour of diamond composite materials. CSIRO Exploration and Mining, PO Box 883, Kenmore QLD 4069, Australia Materials 2010, 3(2), 1390-1419. Published Feb. 24, 2010. 30 pages.

Radtke et al., Thermally stable polycrystalline diamond cutters for drill bits. SPE-90845. SPE Annual Technical Conference and Exhibition, Sep. 26-29, 2004, Houston, Texas. 6 pages.

Sneedon et al., Polycrystalline diamond: manufacture, wear mechanisms, and implications for bit design. Journal of Petroleum Technology vol. 40, No. 12 pp. 1593-1601 Dec. 1988. 9 pages.

Bellin et al., The current state of PDC bit technology Part 3 of 3: Improvements in material properties and testing methods are being pursued to make PDC the cutter of choice for an increasing variety of applications. World Oil, Nov. 2010 issue, pp. 67-71.

International Preliminary Report on Patentability issued in related International Patent application PCT/US2016/066701, dated Jun. 28, 2018, 14 pages.

International Preliminary Report on Patentability issued in related International Patent application PCT/US2016/066704, dated Jun. 28, 2018, 12 pages.

International Preliminary Report on Patentability issued in related International Patent application PCT/US2016/066730, dated Jun. 28, 2018, 7 pages.

Office Action issued in U.S. Appl. No. 16/061,669 dated Apr. 5, 2019, 9 pages.

Office Action issued in U.S. Appl. No. 16/061,680 dated Mar. 29, 2019, 11 pages.

(56) References Cited

OTHER PUBLICATIONS

First Office Action and Search Report issued in Chinese Patent Application No. 201680074980.7 dated Jul. 18, 2019, 16 pages.
First Office Action and Search Report issued in Chinese patent application 201680073227.6 dated Aug. 2, 2019, 8 pages.
First Office Action and Search Report issued in Chinese patent application 201680073209.8 dated Aug. 5, 2019, 11 pages.
Office Action issued in U.S. Appl. No. 16/061,680 dated Nov. 12, 2019, 14 pages.
Office Action issued in U.S. Appl. No. 16/061,680 dated Mar. 11, 2020, 17 pages.
Office Action issued in U.S. Appl. No. 16/061,669 dated Oct. 21, 2019, 11 pages.
Advisory Action issued in U.S. Appl. No. 16/061,669 dated Jan. 10, 2020, 5 pages.
Second Office Action and Search Report issued in Chinese Patent Application No. 201680074980.7 dated Jul. 3, 2020, 17 pages, with English translation.

* cited by examiner

MECHANICAL LOCKING OF OVOID CUTTING ELEMENT WITH CARBIDE MATRIX

CROSS-REFERENCE TO RELATED APPLICATIONS

N/A

BACKGROUND OF THE DISCLOSURE

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled.

The drilling system may drill a wellbore or other borehole through a variety of formations. The formation may include geologic formations ranging from unconsolidated material to rock formations such as granite, basalt, or metamorphic formations. The drilling system may include a drill bit with a plurality of cutting elements located on the bit to loosen and/or remove material from the formation to create the wellbore. An ultrahard material is conventionally used to provide a cutting edge or surface on the cutting element that is sufficiently durable to penetrate through the formation and maintain desirable uptime of the drilling system.

The ultrahard material is not brazable itself, and several materials are used to affix a layer of the ultrahard material to a drill bit. For example, in a conventional fixed cutter bit, the ultrahard material is manufactured in a single cutting element, which is then affixed to a wettable matrix to allow the ultrahard material to be indirectly brazed to a drill bit. The ultrahard material is affixed to the matrix by an intermediate material that infiltrates both the matrix and the ultrahard material. The cutting elements are replaced in the drill bit after a portion of the ultrahard material is worn.

SUMMARY

In some embodiments, a cutting assembly includes an insert including an ultrahard material and a matrix including a matrix material. At least a part of the insert has an ovoid outer surface. The matrix surrounds the insert by at least 50% in at least one axis to restrain the insert in the matrix, and a contact surface between the insert and the matrix includes the ovoid outer surface.

In other embodiments, a cutting assembly includes an insert including an ultrahard material and a matrix including a matrix material. The insert has a contact surface that is curved in two directions, a front surface that is curved in a first direction and straight in an orthogonal second direction, and a planar end surface. The matrix surrounds the insert by at least 50% in at least one axis to restrain the insert in the matrix, and the matrix is positioned proximate the insert at the contact surface.

In yet other embodiments, a method of manufacturing a cutting assembly includes providing an ovoid insert including an ultrahard material, casting a matrix substantially surrounding at least a portion of the ovoid insert, grinding a top surface of the ovoid insert and the matrix, and grinding a sidewall of the ovoid insert and the matrix.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a side view of an embodiment of an ovoid insert having a generally spherical shape, according to the present disclosure;

FIG. 2-2 is a side view of an embodiment of an ovoid insert having a major axis and a minor axis, according to the present disclosure;

DETAILED DESCRIPTION

This disclosure generally relates to devices, systems, and methods for producing inserts and cutting assemblies for use in drill bits and/or drilling wellbores in earthen and/or other material. In some embodiments, the insert may include or be made of ultrahard material. The insert may be mechanically connected to a matrix to form a cutting assembly. The mechanical connection may be formed by at least a portion of the matrix extending at least 50% of the way around the ovoid insert to retain the insert in the matrix. In some embodiments, the curing of the matrix from a precursor (e.g., a powder, metal alloy, epoxy, gel, other fluid, or combinations thereof) to a solid body may occur at an elevated temperature (e.g., between 600° and 1200°) and the matrix may have a greater coefficient of thermal expansion than the ultrahard material. The thermal compression of the matrix during cooling from the curing process may apply a compressive force to the ovoid insert, thereby compressing the insert in the matrix.

Figure 1:
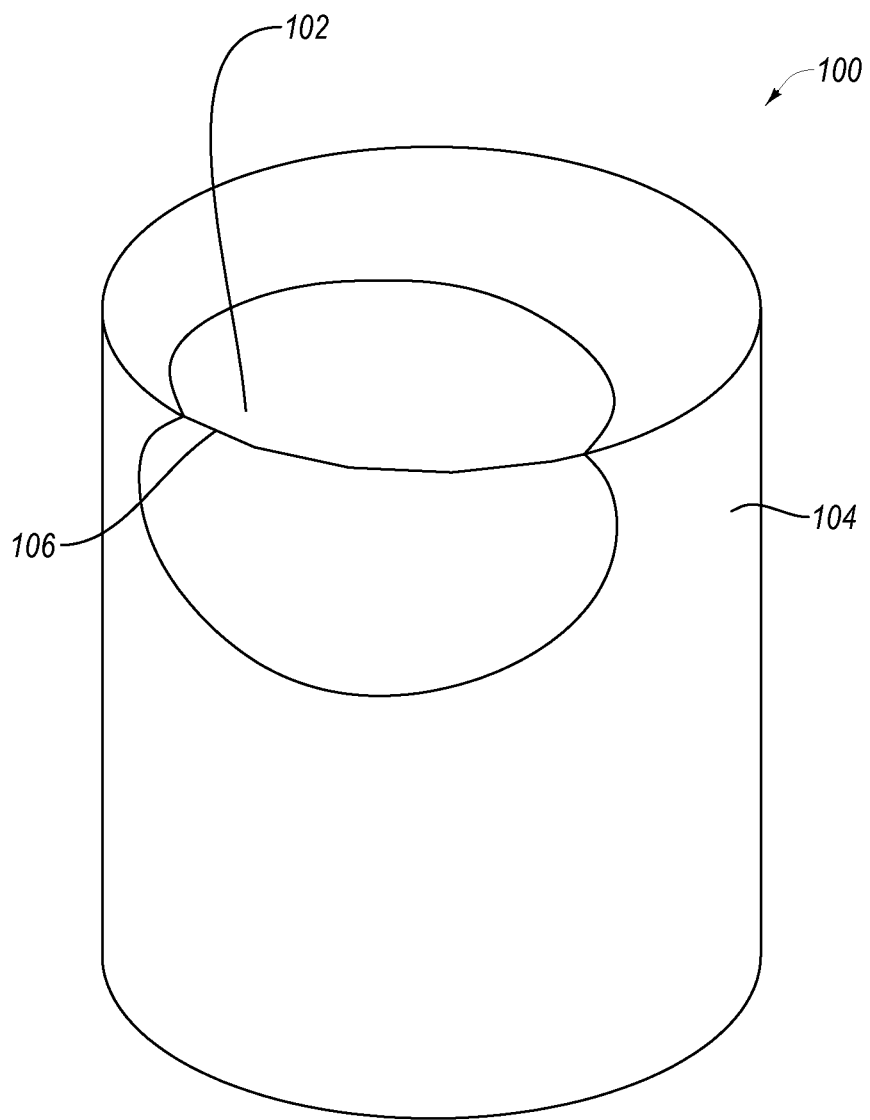
FIG. 1 is a perspective view of an embodiment of a cutting assembly, according to the present disclosure.

FIG. 1 is a perspective view of an embodiment of a cutting assembly 100, according to the present disclosure. The cutting assembly 100 may have an insert 102 including or made of an ultrahard material. As used herein, the term "ultrahard" is understood to refer to those materials known in the art to have a grain hardness of about 1,500 HV (Vickers hardness in kg/mm$^2$) or greater. Such ultra-hard materials can include those capable of demonstrating physical stability at temperatures above about 750° C., and for certain applications above about 1,000° C., that are formed from consolidated materials. Such ultrahard materials can include but are not limited to diamond or polycrystalline diamond (PCD) including leached metal catalyst PCD, non-metal catalyst PCD, binderless PCD, nanopolycrystalline diamond (NPD), or hexagonal diamond (Lonsdaleite); cubic boron nitride (cBN); polycrystalline cBN (PcBN); Q-carbon; binderless PcBN; diamond-like carbon; boron suboxide; aluminum manganese boride; metal borides; boron carbon nitride; and other materials in the boron-nitrogen-carbon-oxygen system which have shown hardness values above 1,500 HV, as well as combinations of the above materials. In at least one embodiment, the insert 102 may be a monolithic PCD. For example, the insert 102 may consist of a PCD compact without an attached substrate or metal catalyst phase. In some embodiments, the ultrahard material may have a hardness values above 3,000 HV. In other embodiments, the ultrahard material may have a hardness value above 4,000 HV. In yet other embodiments, the ultrahard material may have a hardness value greater than 80 HRa (Rockwell hardness A).

In some embodiments, the insert 102 may be a generally ovoid shape. In other embodiments, such as shown in FIG. 1, the insert may be at least partially ovoid, such that the majority of the insert has an ovoid outer surface that is curved in two directions. In some embodiments, the ovoid outer surface may be elliptical in at least one direction. In other embodiments, the ovoid outer surface may be elliptical in at least two directions. In yet other embodiments, the ovoid outer surface may be elliptical in all three orthogonal directions. In at least one embodiment, the ovoid outer surface may be spherical (e.g., being circular in three orthogonal directions).

In some embodiments, the insert 102 may be held or retained in a matrix 104. The matrix 104 may include one or more matrix materials. In some embodiments, the matrix may include or be made of a matrix material having a different coefficient of thermal expansion than the ultrahard material of the insert 102. For example, the matrix material may be tungsten carbide with a coefficient of thermal expansion of 5.0-11.0 micrometers per meter-Kelvin and the ultrahard material may be a PCD with a coefficient of thermal expansion of 1.3-3.9 micrometers per meter-Kelvin.

In some embodiments, the thermal expansion differential between the insert 102 and the matrix 104 may be used to produce a residual stress on the insert 102. For example, the matrix material and ultrahard material may be heated during curing of a matrix precursor to form the matrix 104. In some embodiments, the matrix precursor may include or be made of a tungsten carbide powder. In other embodiments, the matrix precursor may include or be made of another carbide powder. In yet other embodiments, the matrix precursor may include or be made of a metal. In further embodiments, the first matrix precursor may include or be made of a matrix material in a suspension or mixed with a fluid substrate.

Upon cooling the matrix 104 and insert 102 after curing the matrix precursor to form the matrix 104, the matrix 104 may contract more than the insert 102. In some embodiments, the matrix 104 may surround at least a part of the insert 102 by 50% or more in at least a first axis, such that the matrix 104 impedes movement of the insert 102 in the first axis. In other embodiments, the matrix 104 may further contact at least a part of the insert 102 in a second axis orthogonal to the first axis, such that the matrix 104 impedes movement of the insert 102 in the first axis and the second axis. In yet other embodiments, the matrix 104 may further contact at least a part of the insert 102 in a third axis orthogonal to the first axis and second axis, such that the matrix 104 impedes movement of the insert 102 in the first axis, the second axis, and the third axis.

The mechanical interlock between the insert and the matrix 104 may translate the differential thermal contraction to the residual stress on the insert 102, compressing the insert 102 toward the matrix 104 and/or directing residual stresses within the ultrahard material of the cutting device 100. In some embodiments, the ovoid outer surface of the insert 102 and the complimentary surface of the matrix 104 proximate the insert 102 may be substantially continuous (e.g., free of discontinuous, angular corners). A substantially continuous contact surface between the insert 102 and the matrix 104 may reduce the number of stress risers in comparison to a conventional cutting assembly with a polygonal insert having one or more corners.

In some embodiments, the matrix 104 may include a brazable matrix material. For example, a brazable material may be any base material that may be infiltrated and/or wetted by a braze alloy without degradation of the base material. For example, matrix 104 may include tungsten carbide, tungsten, cobalt, nickel, manganese, tin, copper, zinc, iron, titanium, vanadium, zirconium, or combinations thereof.

As described herein, in some embodiments, at least part of the insert 102 may have an ovoid outer surface. In some embodiments, a cutting assembly 100 may be formed by embedding an ovoid insert 102 in a matrix 104 and removing (e.g., by grinding, laser ablation, hydrojet cutting, etc.) material from the insert 102 and matrix 104 to form a cutting edge 106 of the cutting assembly 100. In some examples, the insert 102 may be cast from ultrahard material precursor into an ovoid shape with a continuous outer surface before grinding.

Figures 1, 2:
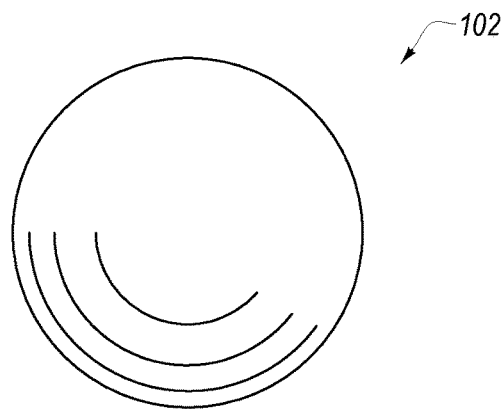
Figure 2:
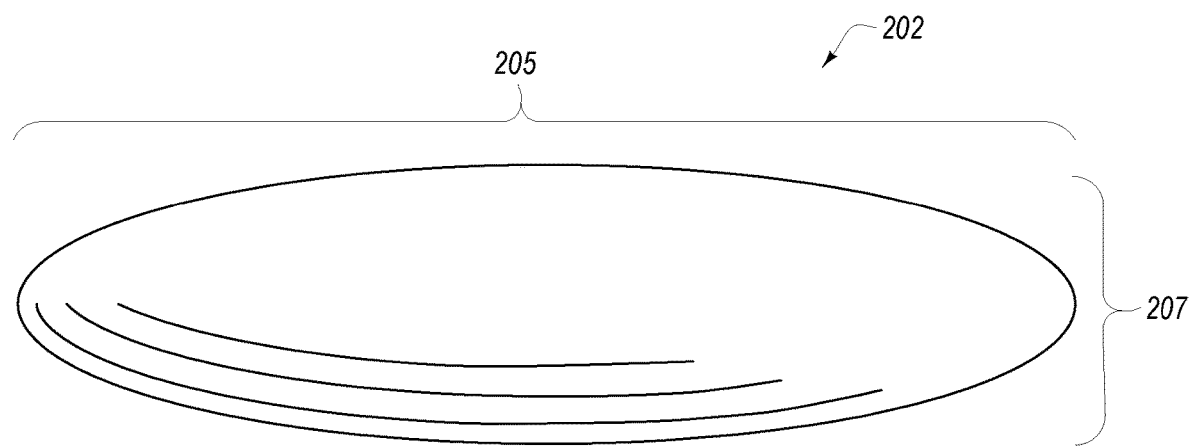

FIG. 2-1 illustrates the embodiment of an insert 102 shown in FIG. 1, prior to embedding the insert 102 in a matrix and grinding at least a portion of the insert 102. The as-cast insert 102, as shown in FIG. 2-1, may be substantially spherical. For example, the as-cast insert 102 may have substantially equal dimensions in all directions. In some embodiments, the spherical insert 102 may allow for more uniform casting in a high pressure, high temperature press, thereby yielding a more uniform ultrahard insert 102.

In other embodiments, an as-cast ovoid insert may have at least one axis that is of a different length from another. FIG. 2-2 illustrates another embodiment of an insert 202 as-cast. The insert 202 is an ovoid shape with a major axis 205 longer than a minor axis 207. The major axis 205 is the longest dimension across the ovoid insert 202. The minor axis 207 is an axis orthogonal to the major axis 205. In spherical embodiments, the major axis 205 may be equal to the minor axis 207 as the dimensions in all axes will be equal. In other embodiments, the major axis 205 and minor axis 207 may have an axial ratio.

In some embodiments, the axial ratio (i.e., major axis 205 to minor axis 207) may be in a range having an upper value, a lower value, or upper and lower values including any of 1.0:1 1.5:1, 2.0:1, 2.5:1, 3.0:1, 3.5:1, 4.0:1, 4.5:1, 5.0:1, or any values therebetween. For example, the axial ratio of the insert 202 may be greater than 1.0:1. In other examples, the axial ratio may be less than 5.0:1. In yet other examples, the axial ratio may be between 1.0:1 and 5.0:1. In further examples, the axial ratio may be between 1.5:1 and 4.5:1. In at least one example, the axial ratio may be about 2.0:1.

Figure 3:
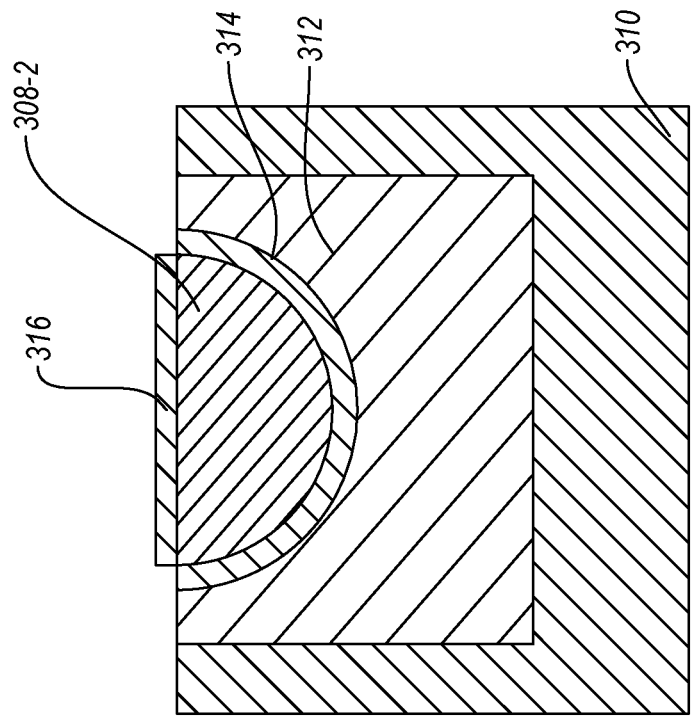
FIG. 3 is a side cross-sectional view of an embodiment of a casting mold for an ovoid insert, according to the present disclosure.
Figure 3:
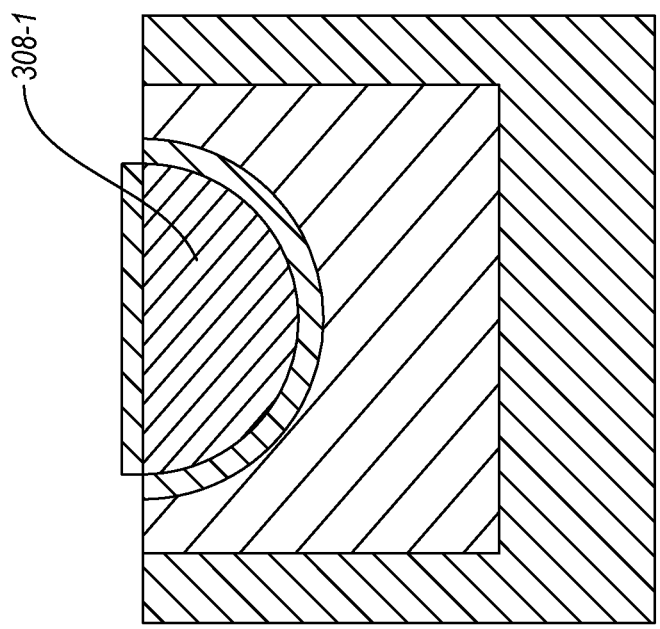

In some embodiments, an insert may be cast in a high pressure, high temperature (HPHT) press. For example, the insert may be cast in a conventional cylindrical press. FIG. 3 is a side cross-sectional view of two halves of a cylindrical can with a first portion 308-1 and a second portion 308-2 of an ultrahard material precursor that may be cast together to form an insert including ultrahard material. In some embodiments, the first portion 308-1 and second portion 308-2 may be positioned inside a cylindrical can 310 with a salt mold 312 therein. The salt mold 312 may hold the first portion 308-1 and a second portion 308-2 of ultrahard material precursor.

In some embodiments, a casting layer 314 may be positioned between the salt mold 312 and the first portion 308-1 and/or second portion 308-2 of ultrahard material precursor. The casting layer 314 may, in some embodiments, be a catalyst that may catalyze the first portion 308-1 and/or second portion 308-2 of ultrahard material precursor during the sintering process. In other embodiments, the casting layer 314 may be a release agent to ensure the first portion 308-1 and/or second portion 308-2 of ultrahard material precursor does not bind to the salt mold 312.

In some embodiments, the insert may be a binderless PCD formed in a high-temperature, high-pressure system. For example, the binderless PCD may be sintered in a pressure range of 10 Gigapascal to 25 Gigapascal and in a temperature range of 1500° Celsius to 3000° Celsius.

In some embodiments, a catalyst layer 316 may be applied to the first portion 308-1 and/or second portion 308-2 of ultrahard material precursor such that when the first portion 308-1 and second portion 308-2 of ultrahard material precursor are positioned adjacent one another to form the general shape of the insert (i.e., when the can 310 and salt mold 312 are closed), the catalyst layer 316 may be positioned between the first portion 308-1 and second portion 308-2 of ultrahard material precursor.

In some embodiments, the catalyst layer 316 and/or casting layer 314 may be a metal catalyst. In other embodiments, the catalyst layer 316 and/or casting layer 314 may be a carbonate catalyst. In some embodiments with a metal catalyst based binder, the insert may be sintered in a pressure range of 5 Gigapascal to 8 Gigapascal and a temperature range of 1300° Celsius to 1600° Celsius. In other embodiments with a carbonate catalyst based insert, the insert may be sintered in a pressure range of 6 Gigapascal to 10 Gigapascal and a temperature range of 1500° Celsius to 2400° Celsius. For example, the insert may include a PCD having a cobalt binder. In another example, the insert may include a PCD having a magnesium carbonate binder. In some embodiments, the binder may be at least partially leached from the insert. For example, a PCD insert with a cobalt binder may have at least some of the cobalt acid-leached from the PCD to yield a TSP. In other embodiments, the binder may be at least decomposed at an elevated temperature. For example, a PCD with a magnesium carbonate binder may have at least some of the magnesium carbonate decomposed into carbon monoxide and/or carbon dioxide by heating the insert to a temperature of more than 500° Celsius.

In some embodiments, at least 50% of the binder material may be removed from the ultrahard material after forming the insert. In other embodiments, at least 80% of the binder material may be removed from the ultrahard material after forming the insert. In yet other embodiments, substantially all of the binder material may be removed from the ultrahard material after forming the insert. In yet further embodiments, less than 5% of the binder material may be removed from the ultrahard material after forming the insert.

Figure 4:
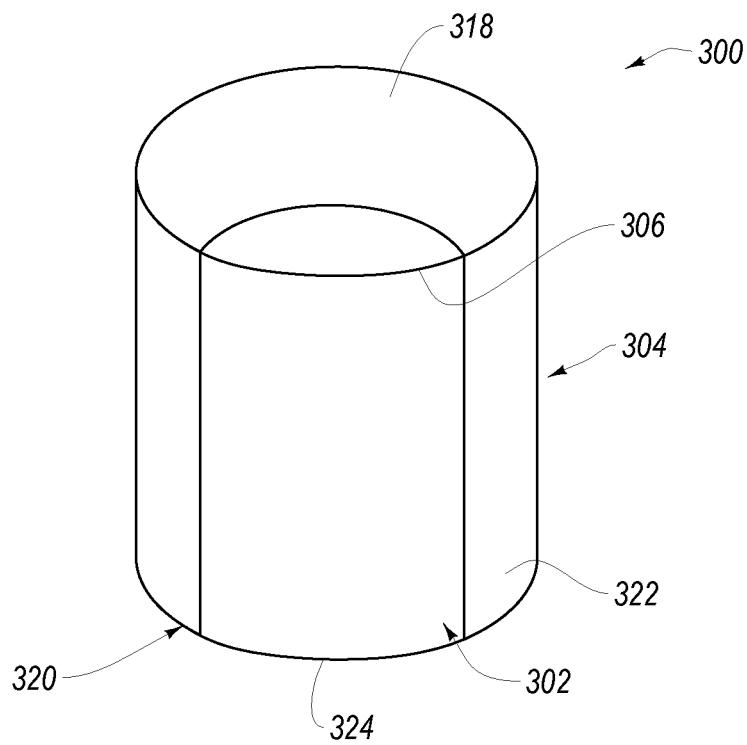
FIG. 4 is a perspective view of another embodiment of a cutting assembly, according to the present disclosure.
Figure 5:
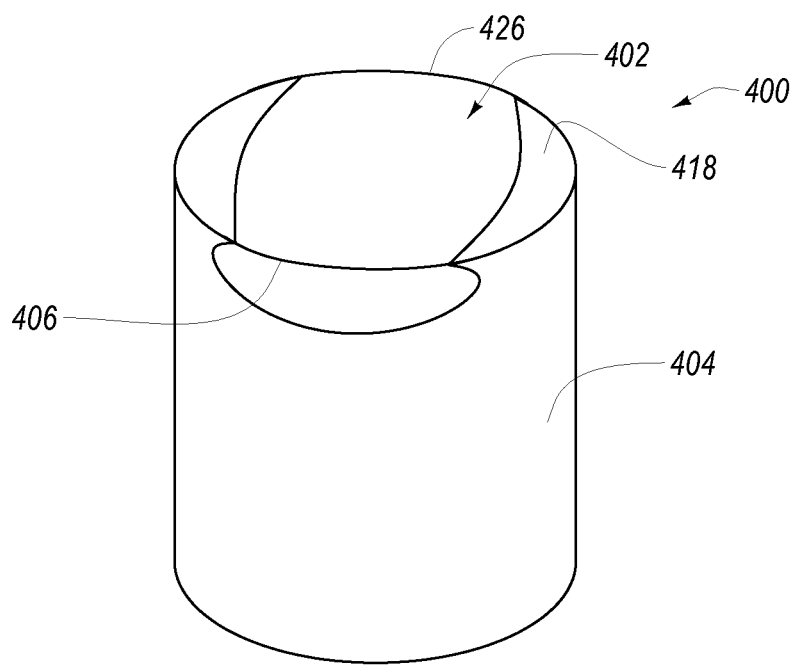
FIG. 5 is a perspective view of yet another embodiment of a cutting assembly, according to the present disclosure.
Figure 6:
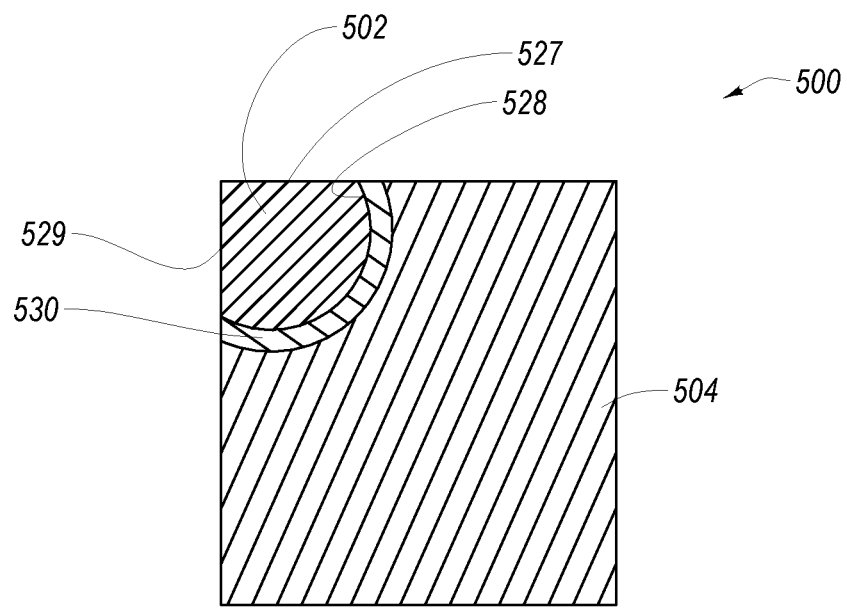
FIG. 6 is a side cross-sectional view of the embodiment of a cutting assembly of FIG. 1, according to the present disclosure.

After casting the insert, the insert may be used to create a cutting assembly with an ultrahard cutting edge. FIG. 4 through FIG. 6 illustrate various embodiments of cutting assemblies including an ovoid insert in a matrix, where at least part of the insert and matrix have been removed to create at least one planar face of the cutting assembly that is partially ultrahard insert and partially matrix.

FIG. 4 illustrates an embodiment of a cylindrical cutting assembly 300 with an insert 302 embedded in a matrix. In some embodiments, the insert 302 may be oriented with a major axis oriented longitudinally in the matrix 304. For example, the insert 302 extends from a first end face 318 of the cutting assembly 300 to an opposing second end face 320 of the cutting assembly 300. The insert 302 may further be exposed along the length of a sidewall 322 of the cutting assembly 300. In some embodiments, the insert 302 may have a first cutting edge 306 at the first end face 318. In some embodiments, the insert 302 may have a second cutting edge 324 at the second end face 320.

FIG. 5 illustrates an embodiment of a cylindrical cutting assembly 400 with an insert 402 embedded in in a matrix 404. In some embodiments, the insert 402 may be oriented with a major axis oriented transversely in the matrix 404. For example, the insert 402 may extend along the end face 418 from a first cutting edge 406 to an opposing rear second cutting edge 426.

FIG. 6 is a side cross-sectional view of another embodiment of a cutting assembly 500. In some embodiments, the cutting assembly 500 may have an insert 502 that is surrounded at least 50% in at least one axis. The matrix 504, therefore, may limit the movement of the insert 502 relative to the matrix 504. In some embodiments, the insert 502 may be adhered in the cutting assembly 500 along at least a portion of the contact surface 528. For example, the insert 502 may be in direct contact with the matrix 504. In other embodiments, the insert 502 may be in contact with a binder layer 530, which may be, in turn, in contact with the matrix 504. The binder layer 530 may provide additional retention of the insert 502 relative to the matrix 504.

In some embodiments, the contact surface 528 may be curved in at least two directions (i.e., may be ovoid). In some embodiments, the cutting assembly 500 and/or insert 502 may have a planar top surface 527, and the insert 502 may have a front surface 529 that is curved in a first direction and straight in a second direction orthogonal to the first direction.

Figure 7:
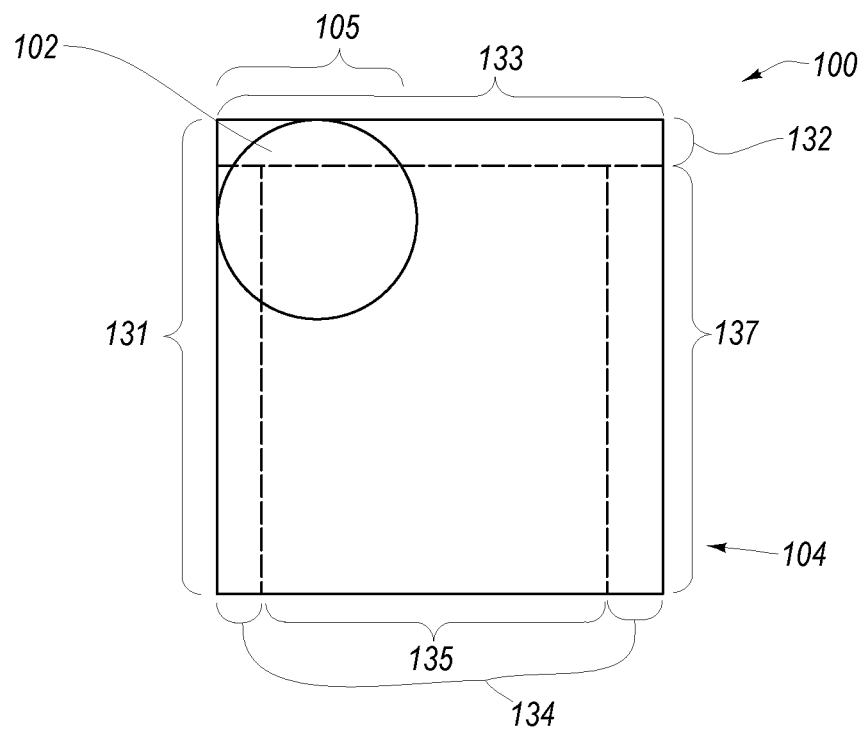
FIG. 7 is a side schematic representation of the material removed during manufacturing of an embodiment of a cutting assembly; according to the present disclosure.

In some embodiments, a cutting assembly may be formed by embedding an insert in a matrix and removing at least a part of the insert and a part of the matrix. FIG. 7 illustrates a previous version of the cutting assembly 100 of FIG. 1. The cutting assembly 100 may include a spherical insert 102 with a major axis 105 and a matrix 104 with a pre-removal diameter 133. In some embodiments, the diameter 133 and major axis 105 may have a major diameter ratio (i.e., diameter 133 to major axis 105) in a range having an upper value, a lower value, or upper and lower values including any of 1:1, 2:1, 3:1, 4:1, 5:1, 6:1, 7:1, 8:1, 9:1, 10:1, or any values therebetween. For example, the major diameter ratio may be greater than 1:1. In other examples, the major diameter ratio may be less than 10:1. In yet other example, the major diameter ratio may be between 1:1 and 10:1. In at least one example, the major diameter ratio may be about 2:1.

In other embodiments, an insert may have a minor axis. In some embodiments, the diameter 133 and minor axis may have a minor diameter ratio (i.e., diameter 133 to minor axis) in a range having an upper value, a lower value, or upper and lower values including any of 2:1, 3:1, 4:1, 5:1, 6:1, 7:1, 8:1, 9:1, 10:1, or any values therebetween. For example, the minor diameter ratio may be greater than 2:1. In other examples, the minor diameter ratio may be less than 10:1. In yet other example, the minor diameter ratio may be between 2:1 and 10:1. In at least one example, the minor diameter ratio may be about 3:1.

In some embodiments, the pre-removal diameter 133 may be reduced by a transverse amount 134 in the transverse direction to create the final diameter 135. In some embodiments, the pre-removal diameter 133 and the final diameter 135 may define a diameter reduction ratio in a range having an upper value, a lower value, or upper and lower values including any of 1.1:1, 1.2:1, 1.3:1, 1.4:1, 1.5:1, 1.6:1, 1.7:1, 1.8:1, 1.9:1, 2.0:1, or any values therebetween. For example, the diameter reduction ratio may be greater than 1.1:1. In other examples, the diameter reduction ratio may be less than 2.0:1. In yet other examples, the diameter reduction ratio may be between 1.1:1 and 2.0:1.

In some embodiments, the cutting assembly 100 may have a pre-removal height 131 that is reduced by a height reduction amount 132 to a final height 137. In some embodiments, the pre-removal height 131 and the final height 137 may define a height reduction ratio in a range having an upper value, a lower value, or upper and lower values including any of 1.1:1, 1.2:1, 1.3:1, 1.4:1, 1.5:1, 1.6:1, 1.7:1, 1.8:1, 1.9:1, 2.0:1, or any values therebetween. For example, the height reduction ratio may be greater than 1.1:1. In other examples, the height reduction ratio may be less than 2.0:1. In yet other examples, the height reduction ratio may be between 1.1:1 and 2.0:1.

Figure 8:
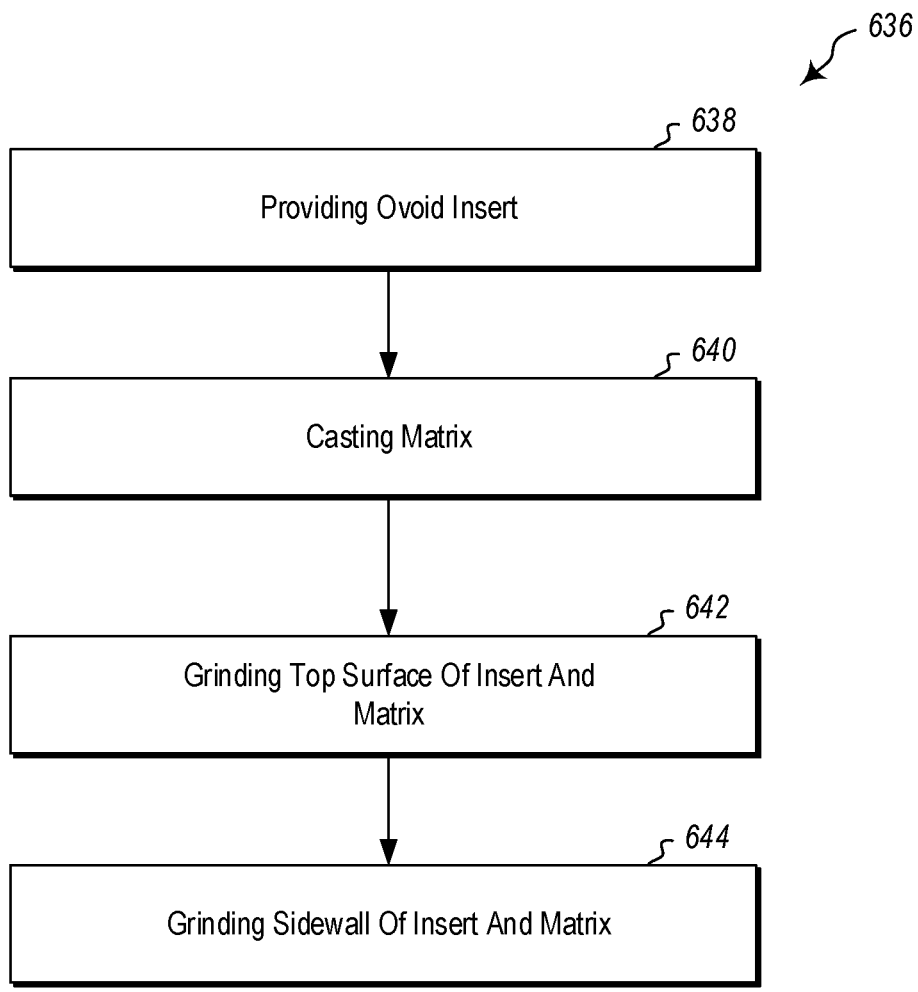
FIG. 8 is a flowchart illustrating an embodiment of a method of manufacturing a cutting assembly, according to the present disclosure.

FIG. 8 illustrates an embodiment of a method 636 for manufacturing a cutting assembly according to the present disclosure. The method 636 includes providing an ovoid insert of ultrahard material at 638 and casting the insert into a matrix at 640, as described herein. For example, casting may include sintering, liquid phase infiltration, partial liquid-phase infiltration, catalyzed curing, other processes of densification, or combinations thereof. In some embodiments, providing the ovoid insert includes casting the ovoid insert from a precursor having a first portion and a second portion that are joined during casting.

After the insert is cast in a matrix, the method 636 may include grinding a top surface of the cutting assembly and removing at least a portion the insert and the matrix to expose at least a portion of the insert at 642. It should be understood that while the present description describes removal of material from the insert and/or matrix by grinding, in other embodiments, material may be removed by other techniques including any of laser ablation, cutting, hydrojets, electrical discharge machining, other material removal techniques or combinations thereof. In other embodiments, a method may further include grinding a bottom surface of the insert and the matrix to expose at least a portion of the insert.

In some embodiments, the method 636 may further include grinding a sidewall of the cutting assembly and removing at least a portion of the insert and the matrix to produce a final diameter of the cutting assembly at 644. In some embodiments, removing material from the lateral sidewalls may include grinding a plurality of cutting assemblies simultaneously with inserts oriented substantially opposing one another. The ultrahard material of the insert may have a slower removal rate relative to the matrix material. Orienting inserts radially opposing one another during the sidewall grinding may allow the sidewalls to remove at a more consistent rate and produce a more circular cutting assembly.

In other embodiments, grinding the sidewall of the insert and matrix may include grinding a front surface of the insert and an opposing rear surface of the insert. In such embodiments, the front surface of the insert may be adjacent the top surface and form a first cutting edge and the opposing rear surface may be adjacent the top surface and form a second cutting edge.

In at least one embodiment, an insert and/or cutting assembly with an ovoid contact surface according to the present disclosure may include less stress risers compared to a conventional cutting assembly. Having less stress risers may reduce fracturing of the insert and/or the adjacent matrix, increasing the operational lifetime of the cutting assembly while drilling in a downhole environment.

The embodiments of cutting devices and assemblies have been primarily described with reference to wellbore drilling and/or drill bit operations, the cutting devices and assemblies described herein may be used in applications other than the drilling of a wellbore. In other embodiments, cutting devices and assemblies according to the present disclosure may be used outside a wellbore or other downhole environment used for the exploration or production of natural resources. For instance, cutting devices and assemblies of the present disclosure may be used in a borehole used for placement of utility lines or mining equipment and/or explosives. Accordingly, the terms "wellbore," "borehole" and the like should not be interpreted to limit tools, systems, assemblies, or methods of the present disclosure to any particular industry, field, or environment.

One or more specific embodiments of the present disclosure will be described below. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

We claim:

1. A cutting assembly for use in a drill bit comprising:
   a matrix including a matrix material;
   an insert embedded in the matrix, the insert including an ultrahard material, the insert having an ovoid contact surface, the matrix encapsulating the insert by at least 50% in at least one axis to restrain the insert in the matrix, wherein the matrix is positioned proximate the insert at the ovoid contact surface;
   a front surface, the insert and the matrix being exposed on the front surface, an insert front surface being curved in a first direction along the front surface and straight in a second direction along the front surface; and
   a top surface, a first end surface of the insert being exposed on the top surface and the matrix being exposed on the top surface, the first end surface on the top surface being planar, wherein a width of the insert increases from the top surface into the matrix along the at least one axis.

2. The cutting assembly of claim 1, the matrix material being a brazable material.

3. The cutting assembly of claim 1, the insert and the matrix directly contacting one another.

4. The cutting assembly of claim 1, further comprising an arcuate cutting edge between the front surface and the first end surface.

5. The cutting assembly of claim 1, the insert further comprising a planar second end surface opposite the first end surface.

6. The cutting assembly of claim 1, the insert further comprising a rear surface curved in the first direction and planar in the second direction, the rear surface being opposite the front surface.

7. The cutting assembly of claim 1, further comprising a binder layer positioned between the insert and the matrix.

8. The cutting assembly of claim 1, the insert being exposed on a sidewall of the matrix and a top surface of the matrix.

9. A method of manufacturing a cutting assembly for use in a drill bit, the method comprising:
   providing an ovoid insert including an ultrahard material;
   casting the ovoid insert into a matrix substantially encapsulating at least a portion of the ovoid insert;
   grinding a top surface of the ovoid insert and the matrix; and
   grinding a sidewall of the ovoid insert and the matrix.

10. The method of claim 9, further comprising grinding a bottom surface of the ovoid insert and the matrix.

11. The method of claim 9, wherein the grinding the sidewall somprises grinding a front surface of the insert and grinding an opposing rear surface of the ovoid insert.

12. The method of claim 9, providing an ovoid insert including casting the ovoid insert from a precursor having a first portion and a second portion joined during casting.

13. The method of claim 9, wherein grinding the top surface includes grinding the ovoid insert and the matrix to expose a top portion of the ovoid insert on the top surface and wherein grinding the sidewall includes grinding the ovoid insert and the matrix to expose a side portion of the ovoid insert on the sidewall.

* * * * *